US009235660B1

(12) United States Patent
Lu et al.

(10) Patent No.: US 9,235,660 B1
(45) Date of Patent: Jan. 12, 2016

(54) SELECTIVE ADDITION OF CLOCK BUFFERS TO A CIRCUIT DESIGN

(71) Applicant: Xilinx, Inc., San Jose, CA (US)

(72) Inventors: Ruibing Lu, Santa Clara, CA (US); Sabyasachi Das, San Jose, CA (US); Zhiyong Wang, Cupertino, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/243,506

(22) Filed: Apr. 2, 2014

(51) Int. Cl.
*G06F 17/50* (2006.01)
(52) U.S. Cl.
CPC ....................................... *G06F 17/50* (2013.01)
(58) Field of Classification Search
CPC ......... G06F 17/5045; G06F 1/10; G06F 1/04; H03K 5/05; H03L 3/00
USPC ..................... 716/113, 114, 116, 134
See application file for complete search history.

(56) References Cited

U.S. PATENT DOCUMENTS

| | | | |
|---|---|---|---|
| 5,361,277 A | | 11/1994 | Grover |
| 6,018,492 A | * | 1/2000 | Sugibayashi ............. 365/233.12 |
| 7,296,246 B1 | | 11/2007 | Kuehlmann et al. |
| 7,576,557 B1 | * | 8/2009 | Tseng et al. ........................ 326/9 |
| 7,694,242 B1 | * | 4/2010 | Li et al. ........................... 716/100 |
| 8,289,063 B2 | | 10/2012 | Chueh et al. |
| 8,539,413 B1 | | 9/2013 | Singla et al. |
| 8,572,530 B1 | | 10/2013 | Fung et al. |
| 8,635,579 B1 | | 1/2014 | Cao et al. |
| 8,966,425 B1 | * | 2/2015 | Eisenstadt et al. ............ 716/120 |
| 2013/0088275 A1 | * | 4/2013 | Fennell et al. ................. 327/292 |

OTHER PUBLICATIONS

Altera, *Quartus II Handbook Version 13.1*, QII52005-13.1.0, Nov. 2013, vol. 2, Chapter 12, pp. 12-1 to 12-46, Altera Corp., San Jose, California, USA.
Altera, *Quartus II Handbook Version 13.1*, QII52007-13.1.0, Nov. 2013, vol. 2, Chapter 16, pp. 16-1 to 16-16, Altera Corp., San Jose, California, USA.
Casanova, Jonas et al., "Multi-level clustering for clock skew optimization," *Proc. of the 2009 International Conference on Computer-Aided Design*, Nov. 2, 2009, pp. 547-554, ACM, New York, New York, USA.
Fishburn, John P., "Clock Skew Optimization," *IEEE Transactions on Computers*, Jul. 1990, pp. 945-951, vol. 39, No. 7, IEEE, Piscataway, New Jersey, USA.
Ni, Min et al., "A Fast Heuristic Algorithm for Multidomain Clock Skew Scheduling," *IEEE Transactions on Very Large Scale Integration (VLSI) Systems*, Apr. 2010, pp. 630-637, vol. 18, No. 4, IEEE, Piscataway, New Jersey, USA.

(Continued)

*Primary Examiner* — Vuthe Siek
(74) *Attorney, Agent, or Firm* — LeRoy D. Maunu

(57) ABSTRACT

In an approach for processing a circuit design by a programmed processor, a placed circuit design that has been placed on programmable resources of a programmable integrated circuit (IC) is input. A critical path is determined from a first sequential element to a second sequential element assigned to the placed circuit design. A first clock buffer that provides a clock signal to the first and second sequential elements is determined, and an unused clock buffer is selected based on proximity to the first sequential element. The circuit design is modified to include the unused clock buffer as a second clock buffer coupled to receive a clock signal in parallel with the first clock buffer and to provide a clock signal to the first sequential element.

11 Claims, 5 Drawing Sheets

(56) References Cited

OTHER PUBLICATIONS

Synopsys, *Synplify Premier* product brochure, copyright 2011, pp. 1-4, Synopsys, Inc., Mountain View, California, USA.

Zhi, Yanling et al., "A Practical Method for Multi-Domain Clock Skew Optimization," *Proc. of the 16th Asia and South Pacific Design Automation Conference*, Jan. 25, 2011, pp. 521-526, IEEE, Piscataway, New Jersey, USA.

* cited by examiner

SELECTIVE ADDITION OF CLOCK BUFFERS TO A CIRCUIT DESIGN

TECHNICAL FIELD

The disclosure generally relates to adding clock buffers to a circuit design.

BACKGROUND

Creating circuit designs targeted to programmable integrated circuits can be challenging because of aggressive timing requirements imposed by applications. A designer may use certain software tools early in the design process, such as before a design has been mapped, placed, or placed and routed, to identify and remedy potential timing problems. Timing problems may be easier to fix if identified early rather than late in the design implementation flow. If timing issues persist after a design has been mapped, placed, or placed and routed, changing the design to achieve timing goals becomes much more difficult.

SUMMARY

According to one embodiment, a method of processing a circuit design is provided. The method includes performing a number of operations using a programmed processor. The operations include inputting a placed circuit design that has been placed on programmable resources of a programmable integrated circuit (IC). The programmable resources include pluralities of sequential elements, clock buffers, and programmable logic. The clock buffers that are assigned to the placed circuit design are referred to as used clock buffers, and the clock buffers that are not assigned to the placed circuit design are referred to as unused clock buffers. The method determines a critical path from a first sequential element to a second sequential element. The first and second sequential elements are ones of the plurality of sequential elements assigned to the placed circuit design. A first clock buffer of the used clock buffers that provides a clock signal to the first and second sequential elements is determined, and one of the unused clock buffers is selected based on proximity to the first sequential element. The placed circuit design is modified to include the one unused clock buffer as a second clock buffer coupled to receive a clock signal in parallel with the first clock buffer and to provide a clock signal to the first sequential element.

According to another method of processing a circuit design on a programmed processor, a placed circuit design that has been placed on programmable resources of a programmable integrated circuit (IC) is input. The programmable resources include pluralities of sequential elements, clock buffers, programmable logic, and programmable routing resources. The programmable resources assigned to the placed circuit design are referred to as used programmable resources, and the programmable resources not assigned to the placed circuit design are referred to as unused programmable resources. The method determines a critical path from a first sequential element to a second sequential element. The first and second sequential elements are ones of the plurality of sequential elements assigned to the placed circuit design. A first clock buffer of the used clock buffers that provides a clock signal to the first and second sequential elements is determined, and one or more of the unused programmable resources are selected. The placed circuit design is modified to include the one or more unused programmable resources in a signal route that carries the clock signal from the first clock buffer to the second sequential element.

A system is provided in another embodiment. The system includes one or more processors and a memory coupled to the one or more processors. The memory is configured with instructions that when executed by the one or more processors cause the one or more processors to input a placed circuit design that has been placed on programmable resources of a programmable integrated circuit (IC). The programmable resources include pluralities of sequential elements, clock buffers, and programmable logic. The clock buffers that are assigned to the placed circuit design are referred to as used clock buffers, and the clock buffers that are not assigned to the placed circuit design are referred to as unused clock buffers. The operations performed by the one or more processors include determining a critical path from a first sequential element to a second sequential element. The first and second sequential elements are ones of the plurality of sequential elements assigned to the placed circuit design. A first clock buffer of the used clock buffers that provides a clock signal to the first and second sequential elements is determined, and one of the unused clock buffers is selected based on proximity to the first sequential element. The placed circuit design is modified to include the one unused clock buffer as a second clock buffer coupled to receive a clock signal in parallel with the first clock buffer and to provide a clock signal to the first sequential element.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings, in which.

DETAILED DESCRIPTION

Signal paths of a circuit design that are determined to be critical (critical paths) often begin at one sequential element (launch sequential element) and end at another sequential element (capture sequential element). A critical path is generally the path with the longest delay in a circuit design. Common sequential elements include flip-flops and latches, and in some programmable ICs sequential elements include block RAMs, shift register look-up tables (SRLs), digital signal processors (DSPs), input/output blocks, etc. The clock terminals of the launch sequential element and the capture sequential element on the critical path are driven by a clock signal from a clock buffer. The implementations disclosed herein automatically insert clock buffers in a design that has been placed or placed-and-routed to adjust the times at which the clock signal arrives at the launch sequential element and at the capture sequential element.

Figure 1:
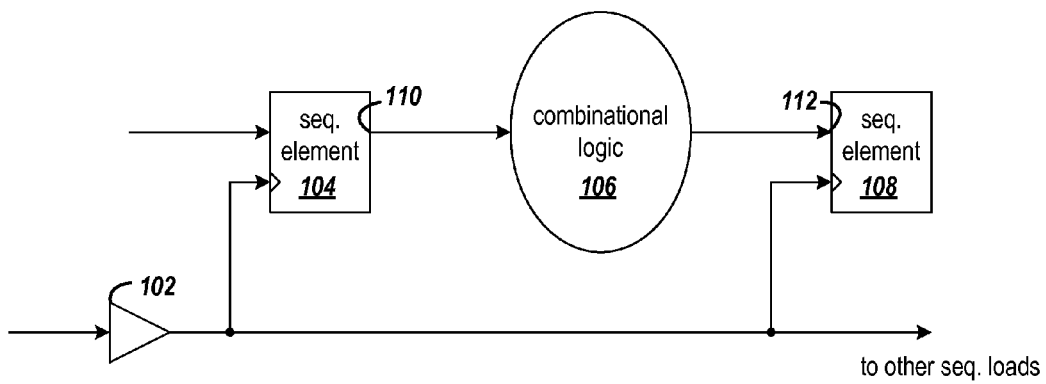
FIG. 1 is a schematic diagram of a portion of a placed circuit design in which a clock buffer is connected to two sequential elements, and a critical path exists from the first sequential element, through combinational logic, to the second sequential element.

FIG. 1 is a schematic diagram of a portion of a placed circuit design in which a clock buffer 102 is connected to two sequential elements, and a critical path exists from the first sequential element 104 (the launch sequential element), through combinational logic 106, to the second sequential element 108 (the capture sequential element). The critical path is from the output terminal 110 of the launch sequential element 104 to the input terminal 112 of the capture sequential element 108.

The disclosed implementations use physical information of the design and available resources of the target device to optimize the circuit design relative to the critical path. The physical information of the design may be determined from the circuit design having been placed or placed and routed on the resources of the target device. Once a circuit design has been placed, the resources assigned to the circuit design and the unused resources of the target device are known.

In a placed or placed and routed circuit design, different strategies may be used to improve the timing. In one approach, the timing may be improved by making the clock signal at the launch sequential element arrive sooner. The clock signal at the launch sequential element may be referred to as the launch clock. Providing the launch clock to the launch sequential element sooner allows the combinational logic 106, which receives the output signal from the launch sequential element, to activate sooner and thereby provide a result signal to the capture sequential element. In one approach, the original clock buffer that drives both the launch sequential element and the capture sequential element may be replicated and connected in parallel with the replicated instance to receive an input clock signal. The replicated instance is dedicated to the launch sequential element, and the original clock buffer provides the clock signal to the capture sequential element 108 and to other sequential loads. An additional clock buffer of a type different from the original clock buffer may be used instead of the replicated instance to clock the launch sequential element.

In another approach, the time at which the clock signal arrives at the capture sequential element 108 may be delayed. This gives more time for the critical path to exercise the combinational logic 106 and to propagate the signal to the input terminal 112 of the capture sequential element. The clock signal may be delayed by cascading clock buffers in the clock signal path to the capture sequential element or by increasing the length of the signal path to the capture sequential element.

Combinations of an additional clock buffer to clock the launch sequential element, cascaded clock buffers, and/or an increased length of the clock signal path may be used to adjust the timing.

Figure 2:
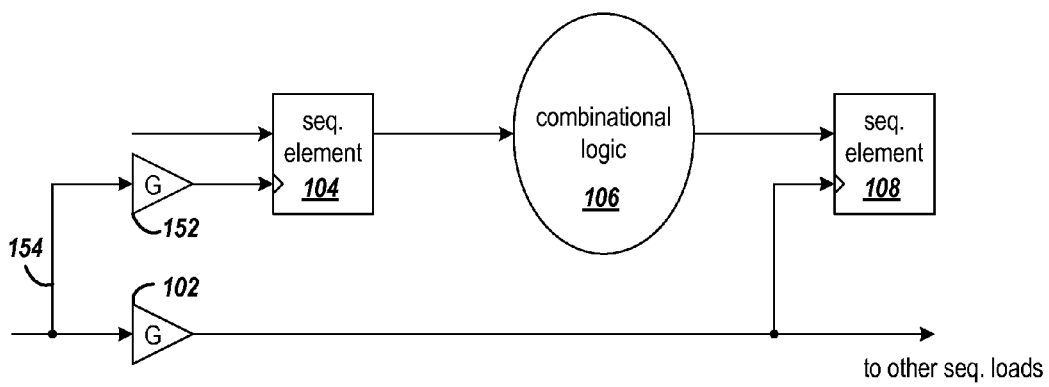
FIG. 2 is a schematic diagram that shows a modification to the portion of the placed circuit design of FIG. 1 in which another instance of the clock buffer is added to reduce the delay of the arrival of the clock signal at the launch sequential element.

FIG. 2 is a schematic diagram that shows a modification to the portion of the placed circuit design of FIG. 1 in which another instance of the clock buffer is added to reduce the delay of the arrival of the clock signal at the launch sequential element.

In some programmable ICs, such as field programmable gate arrays (FPGAs), there are numerous different types of clock buffers. In FPGAs from XILINX®, Inc., for example, there are generally two types of clock buffers, global clock buffers and local clock buffers. Global clock buffers drive the global clock lines and are used to access global clock lines in the device. A local clock buffer, such as the horizontal clock buffer, allows access to the global clock lines of the device in a single clock region through the horizontal clock row.

The following are examples of the types of global clock buffers in XILINX FPGAs: BUFG, BUFGCE_DIV, BUFGCTRL, BUFGCE, BUFG_GT, BUFGMUX, BUFGDLL, BUFGMUX_CTRL, BUFGP, BUFPLL, BUFPLL_MCB, BUFG_LB, BUFGCE_1, etc. Examples of local clock buffers in XILINX FPGAs include: BUFR, BUFH, BUFMR, BUFHCE, BUFMRCE, etc. For ease of reference, a global clock buffer may be generally labeled BUFG, and a local clock buffer may be generally labeled BUFH.

In the example shown in FIG. 2, the clock buffer 102 is a global clock buffer, and another of the global clock buffers that is available on the device, in this example, clock buffer 152, is selected. Since the input circuit design being modified has been placed, the clock buffer 152 may be selected from the set of clock buffers that have not been used by the circuit design and that are of the same type as clock buffer 102. Clock buffer 152 is connected in parallel with clock buffer 102 to receive clock signal 154 and to output the clock signal directly to the launch sequential element 104. Since the clock buffer 102 no longer drives both launch sequential element 104 and capture sequential element 108, the fanout is reduced, thereby reducing the delay of the clock signal to the launch sequential element 104 and allowing the combinational logic 106 to be exercised sooner.

Figure 3:
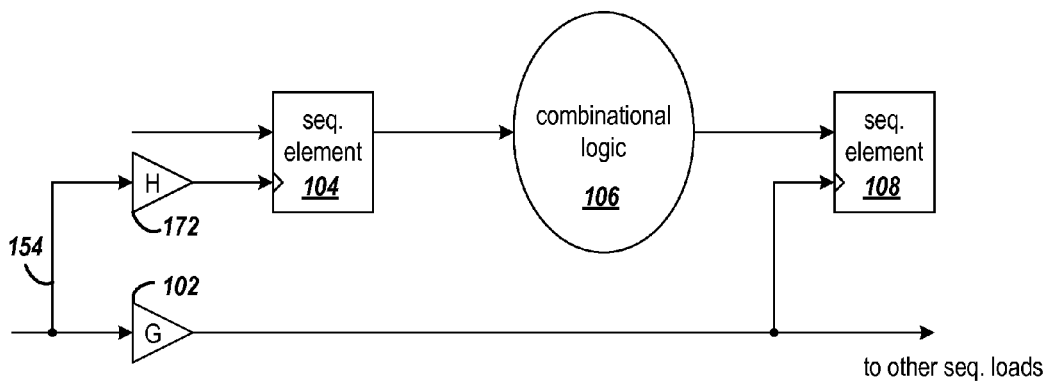
FIG. 3 is a schematic diagram that shows a modification to the portion of the placed circuit design of FIG. 1 in which another clock buffer of a different type is added to reduce the delay of the arrival of the clock signal at the launch sequential element.

FIG. 3 is a schematic diagram that shows a modification to the portion of the placed circuit design of FIG. 1 in which another clock buffer of a different type is added to reduce the delay of the arrival of the clock signal at the launch sequential element.

In the example shown in FIG. 3, the clock buffer 102 is a global clock buffer, and a clock buffer 172 of a type different from the clock buffer 102 is selected from the set of clock buffers that have not been used by the circuit design and that is of a type different from the type of clock buffer 102. The different type of clock buffer may be a different type of global clock buffer or one of the types of local clock buffers. It will be recognized that the selection of the particular clock buffer depends on which clock buffers are available (not already used by the design), the location of the launch sequential circuit on the target device, and which clock buffers can be connected to the launch sequential circuit. Clock buffer 172 is connected in parallel with clock buffer 102 to receive clock signal 154.

Figure 4:
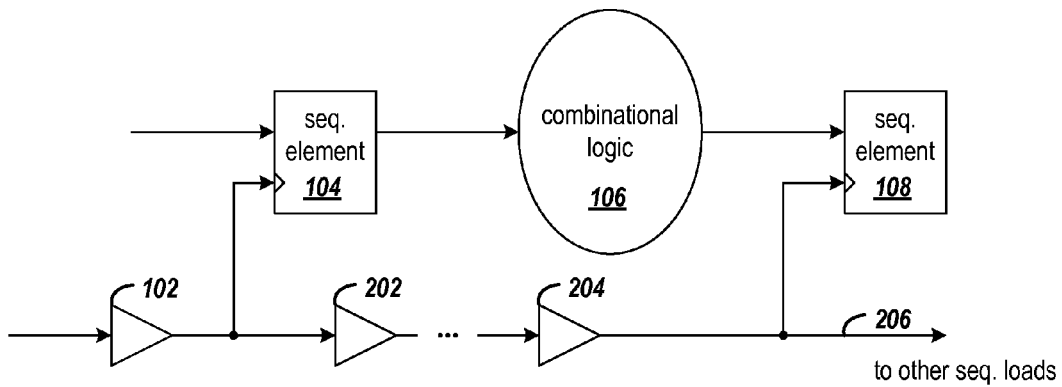
FIG. 4 is a schematic diagram that shows a modification to the portion of the placed circuit design of FIG. 1 in which cascaded clock buffers are added to delay the arrival of the clock signal at the capture sequential element.

FIG. 4 is a schematic diagram that shows a modification to the portion of the placed circuit design of FIG. 1 in which cascaded clock buffers are added to delay the arrival of the clock signal at the capture sequential element. The added clock buffers effectively allow more time for the combinational logic 106 to complete.

Clock buffer 102 is the original clock buffer of the placed circuit design. One or more additional clock buffers, for example, clock buffers 202-204 are selected from the unused clock buffers of the target device. The circuit design is modified to include the one or more additional clock buffers, and the one or more clock buffers are serially connected to receive the clock signal output from the original clock buffer 102 and provide the clock signal to the capture sequential element 108. The selected unused clock buffers are generally of similar type and generally depend on the architecture of the target device.

In an example implementation, the additional clock buffers 202-204 are connected immediately after the original clock buffer 102. This has the effect of adding delay to the path 206 to other sequential loads in the clock tree that branch from the clock buffer 102. The added delay may be beneficial because a setup violation at the path that ends at the capture sequential element may be remedied, contributing to the successful closure of timing for the design.

Figure 5:
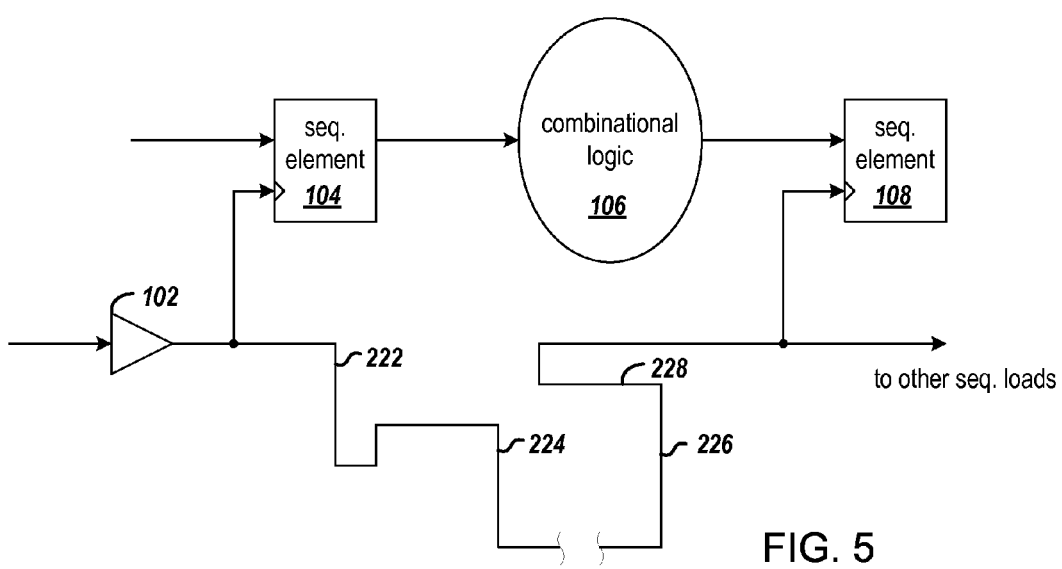
FIG. 5 is a schematic diagram that shows a modification to the portion of the placed circuit design of FIG. 1 in which additional programmable routing resources are connected between the clock buffer and the second sequential element in order to delay the arrival of the clock signal at the capture sequential element.

FIG. 5 is a schematic diagram that shows a modification to the portion of the placed circuit design of FIG. 1 in which additional programmable routing resources are connected between the clock buffer and the second sequential element in order to delay the arrival of the clock signal at the capture sequential element.

In an example implementation, the signal route from the clock buffer 102 to the capture sequential element 108 may be structured to increase the delay on the clock signal path. The arrangement of the line segments, for example segments 222, 224, 226, and 228, represent physical programmable routing resources on a target device that are programmably connected to carry the clock signal from the clock buffer to the capture sequential element. The clock signal path from the clock buffer to the capture sequential element is an indirect route, rather than the more direct route illustrated in FIG. 1, thereby delaying the arrival of the clock signal at the capture sequential element. The number and arrangement of selected programmable routing resources may be preconfigured by the designer, for example.

Figure 6:
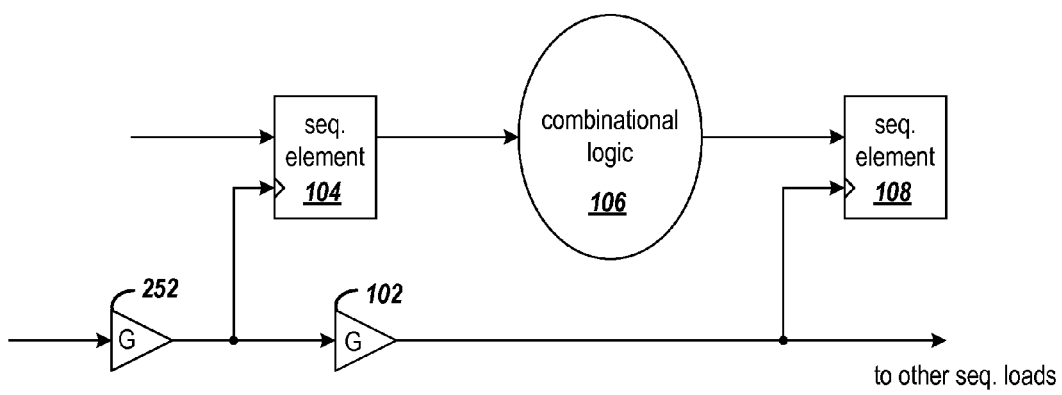
FIG. 6 is a schematic diagram that shows a modification to the portion of the placed circuit design of FIG. 1 in which another instance of the clock buffer is added to provide the clock signal to the launch sequential element, and the original clock buffer is used to delay the clock signal to the capture sequential element.

FIG. 6 is a schematic diagram that shows a modification to the portion of the placed circuit design of FIG. 1 in which another instance of the clock buffer is added to provide the clock signal to the launch sequential element, and both the added clock buffer and the original clock buffer are used to delay the clock signal to the capture sequential element. The circuit of FIG. 6 uses a combination of the approaches shown in FIGS. 2 and 4. Another clock buffer 252, which is of the same type as the original clock buffer 102 may be added to drive the clock signal to the launch sequential element 104. Instead of the added clock buffer 252 being connected in parallel with the original clock buffer 102, the clock buffers 252 and 102 are serially connected, and the output clock signal from clock buffer 102 is provided to the capture sequential element 108. The indirect routing approach described above in the discussion of FIG. 5 may also be used in combination with the techniques shown in FIG. 6 to further delay the arrival of the clock signal at the capture sequential element.

Figure 7:
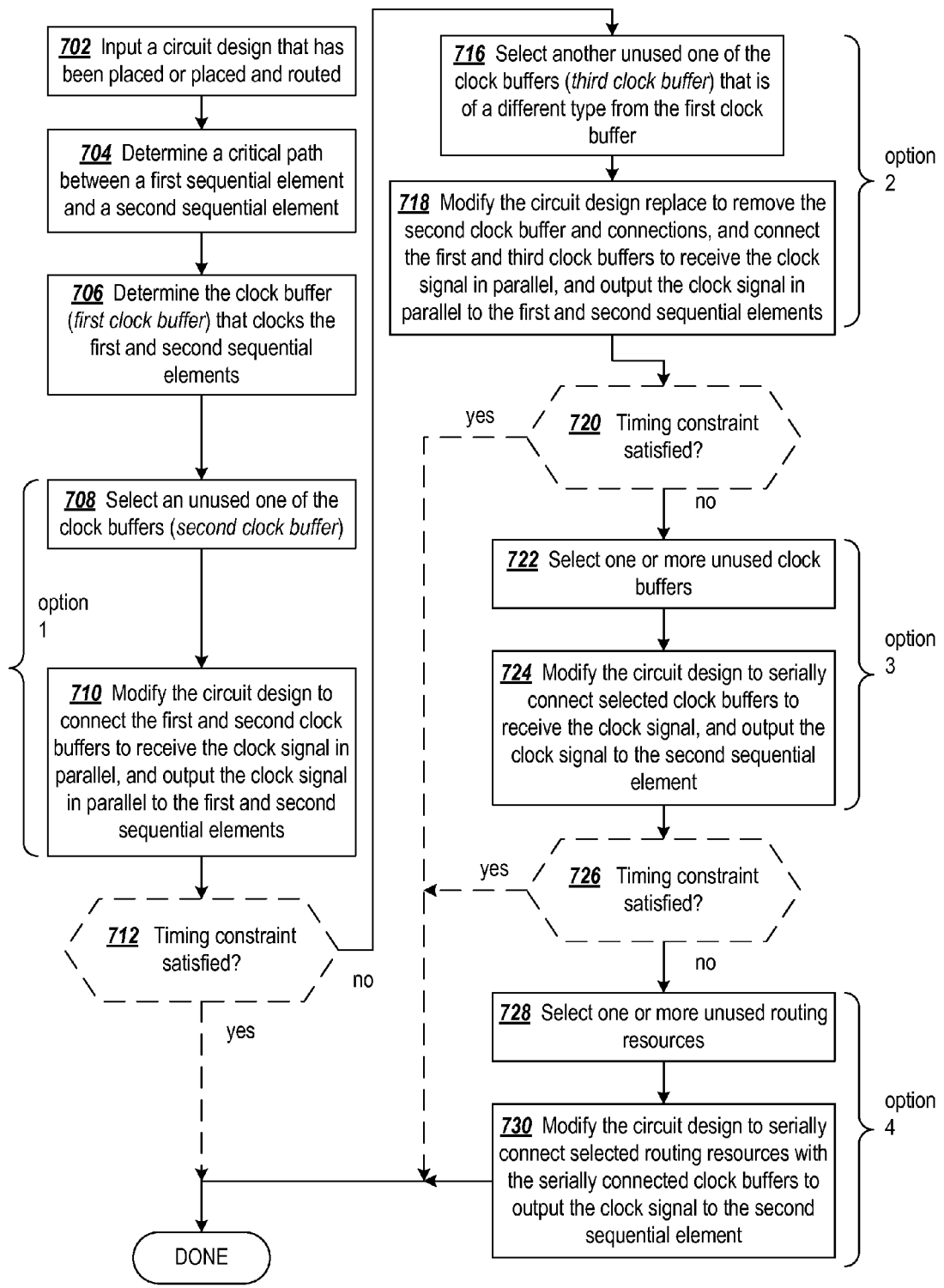
FIG. 7 is a flowchart of a process of optimizing the timing of a placed or placed-and-routed circuit design.

FIG. 7 is a flowchart of a process of optimizing the timing of a placed or placed-and-routed circuit design. The process of FIG. 7 illustrates 4 general approaches or options for optimizing the timing of the design. The options are labelled 1-4 in the diagram and may be performed in any combination and in any order. For example, each option may be performed individually without performing any other of the options. Or two or more of the options may be performed in any desired order. With options 1 and 2, however, it will be appreciated that while both options may be performed on a circuit design, the results of only one will be saved since the clock buffer added in both options has its output connected to the input of the launch sequential element. It will be appreciated that the order in which the options are shown in the diagram does not imply any particular order in which modifications are to be made to the circuit design.

At block 702, the circuit design to be processed is input. The circuit design may be either placed or placed and routed. With a placed design, the process is able to determine which resources, for example, clock buffers and/or routing resources, are available for modifying the clock signal path. A critical path between a first sequential element and a second sequential element of the circuit design is determined at block 704. The critical path may be determined using known approaches. The clock buffer (first clock buffer) that clocks the first and second sequential elements on the critical path is determined at block 706.

A first option for modifying the clock signal path is performed at blocks 708 and 710. An unused clock buffer, which is referred to as the second clock buffer, is selected at block 708. Since the circuit design has been placed, those clock buffers that have not been assigned for use by the circuit design are known, and the second clock buffer may be selected from that set of unused clock buffers. In an example implementation, the selected clock buffer is of the same type as the first clock buffer, and the selected clock buffer is one that is proximate (for routing purposes) the first sequential element. The proximate clock buffer may be one that is less than a threshold routing distance from the first sequential element or may be the clock buffer that is closest by routing distance to the first sequential element. At block 710, the circuit design is modified to include the second clock buffer such that the first and second clock buffers are coupled to receive the clock signal in parallel, the second clock buffer provides the clock signal directly (no intervening sequential elements or clock buffers) to the first sequential element, and the first clock buffer provides the clock signal directly to the second sequential element.

An optional check may be performed at decision block 712 to determine whether or not the change to the circuit design made at block 710 satisfies a timing constraint. The check is optional because some implementations may add the clock buffer during a physical synthesis optimization flow and leave the checking of timing constraints until later stages of the design implementation flow. In an implementation in which the timing constraint is checked, if the timing constraint is satisfied, the process is complete. In another implementation, a modification to the circuit design may be optionally undone if the timing constraint is not satisfied with the modified clock signal path. The process proceeds to block 716 if the timing constraint is not satisfied.

At block 716, the process selects another unused clock buffer from the set of unused clock buffers. The selected clock buffer (third clock buffer) is of a type that is different from the first clock buffer. As with the clock buffer selected for option 1, the one of the unused clock buffers that is selected as the third clock buffer is proximate the first sequential element. At block 718, the circuit design is modified to include the third clock buffer such that the first and third clock buffers are coupled to receive the clock signal in parallel, the third clock buffer provides the clock signal directly to the first sequential element, and the first clock buffer provides the clock signal directly to the second sequential element. Note that if present, the second clock buffer would be removed from the circuit design before adding the third clock buffer.

At decision block 720, an optional check is performed to determine whether or not the timing constraint is satisfied. If so, the process is complete. Otherwise, the process is directed to block 722.

Options 3 and 4 entail inserting additional programmable resources in the clock signal path to the second sequential element. In option 3, clock buffers are inserted, and in option 4, additional routing resources are added to the clock signal path. At block 722, one or more clock buffers are selected from the set of unused clock buffers. At block 724, the circuit design is modified such that the selected clock buffers are serially connected between the first clock buffer and the second sequential element. The clock signal output from the serially connected clock buffers is provided directly to the second sequential element.

At decision block 726, an optional check is performed to determine whether or not the timing constraint is satisfied. If so, the process is complete. Otherwise, the process is directed to block 728.

Blocks 728 and 730 show the fourth option for modifying the clock signal path. At block 728, one or more routing resources are selected. If the input circuit design has been placed and routed, then the one or more routing resources are selected from the routing resources that are unused by the circuit design. Otherwise, any available routing resources may be selected. The selection of the routing resources may be based on a target path length from a clock buffer, such as the first clock buffer or the last cascaded clock buffer, to the second sequential element. At block 730, the circuit design is modified such that the selected programmable routing resources are serially connected to route the clock signal from the clock buffer to the second sequential element.

Figure 8:
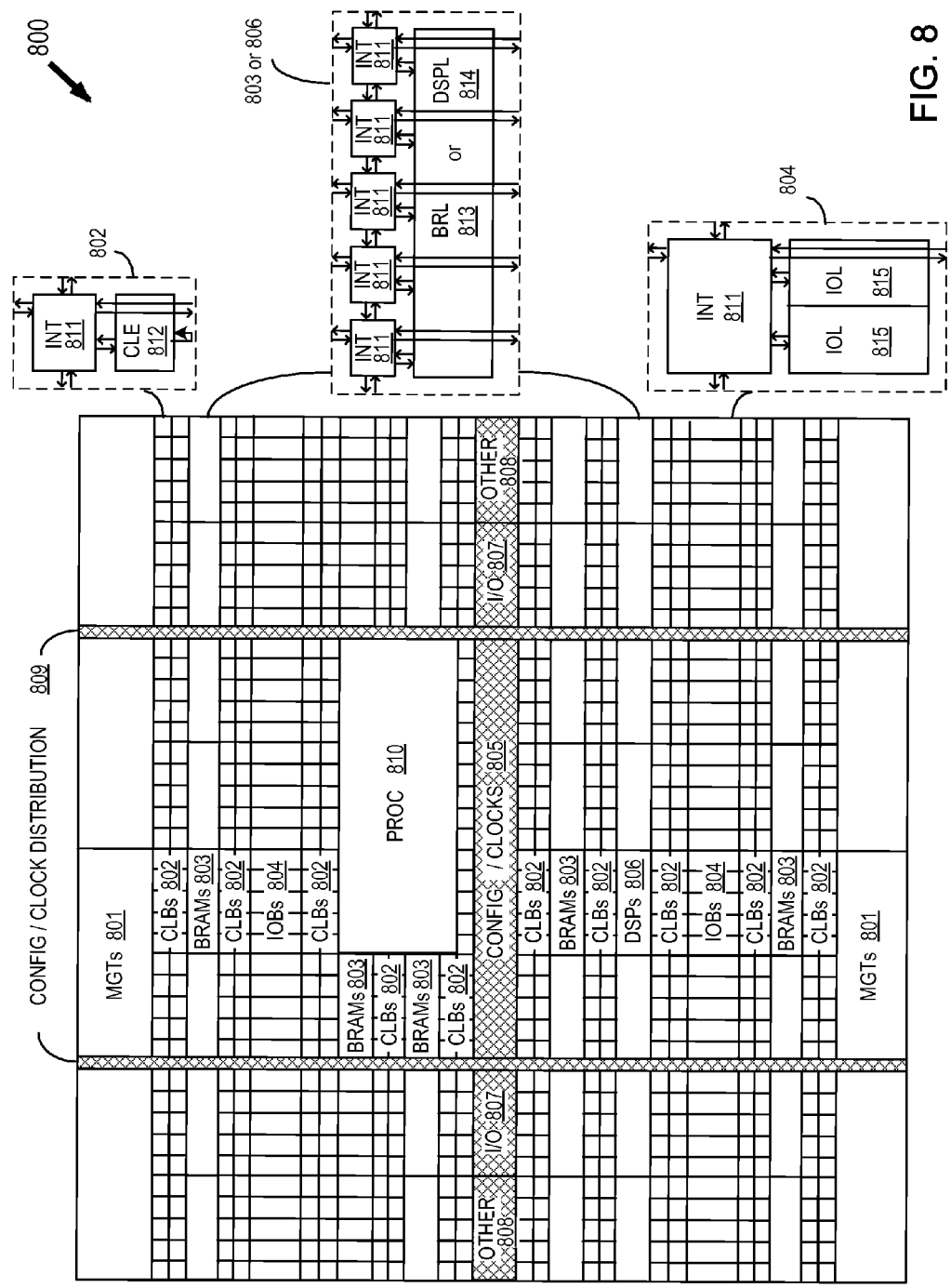
FIG. 8 is a block diagram of an example programmable integrated circuit on which a circuit design may be implemented.

FIG. 8 is a block diagram of an example programmable integrated circuit on which a circuit design may be implemented. The programmable integrated circuit (IC) includes programmable resources such as sequential elements, clock buffers, programmable logic, and programmable routing resources as described below. The programmable IC shown in FIG. 8 is an example of the type of programmable IC on which a circuit design may be placed, or placed and routed, and processed according to the processes described above.

FPGAs can include several different types of programmable logic blocks in the array. For example, FIG. 8 illustrates an FPGA architecture (800) that includes a large number of different programmable tiles including multi-gigabit transceivers (MGTs) 801, configurable logic blocks (CLBs) 802, random access memory blocks (BRAMs) 803, input/output blocks (IOBs) 804, configuration and clocking logic (CONFIG/CLOCKS) 805, digital signal processing blocks (DSPs) 806, specialized input/output blocks (I/O) 807, for example, clock ports, and other programmable logic 808 such as digital clock managers, analog-to-digital converters, system monitoring logic, and so forth. Some FPGAs also include dedicated processor blocks (PROC) 810 and internal and external reconfiguration ports (not shown).

In some FPGAs, each programmable tile includes a programmable interconnect element (INT) 811 having standardized connections to and from a corresponding interconnect element in each adjacent tile. Therefore, the programmable interconnect elements taken together implement the programmable interconnect structure for the illustrated FPGA. The programmable interconnect element INT 811 also includes the connections to and from the programmable logic element within the same tile, as shown by the examples included at the top of FIG. 8.

For example, a CLB 802 can include a configurable logic element CLE 812 that can be programmed to implement user logic, plus a single programmable interconnect element INT 811. A BRAM 803 can include a BRAM logic element (BRL) 813 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 806 can include a DSP logic element (DSPL) 814 in addition to an appropriate number of programmable interconnect elements. An IOB 804 can include, for example, two instances of an input/output logic element (IOL) 815 in addition to one instance of the programmable interconnect element INT 811. As will be clear to those of skill in the art, the actual I/O bond pads connected, for example, to the I/O logic element 815, are manufactured using metal layered above the various illustrated logic blocks, and typically are not confined to the area of the input/output logic element 815.

In the pictured embodiment, a columnar area near the center of the die (shown shaded in FIG. 8) is used for configuration, clock, and other control logic. Horizontal areas 809 extending from this column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, the processor block PROC 810 shown in FIG. 8 spans several columns of CLBs and BRAMs.

Note that FIG. 8 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 8 are purely exemplary. For example, in an actual FPGA, more than one adjacent column of CLBs is typically included wherever the CLBs appear, to facilitate the efficient implementation of user logic.

Figure 9:
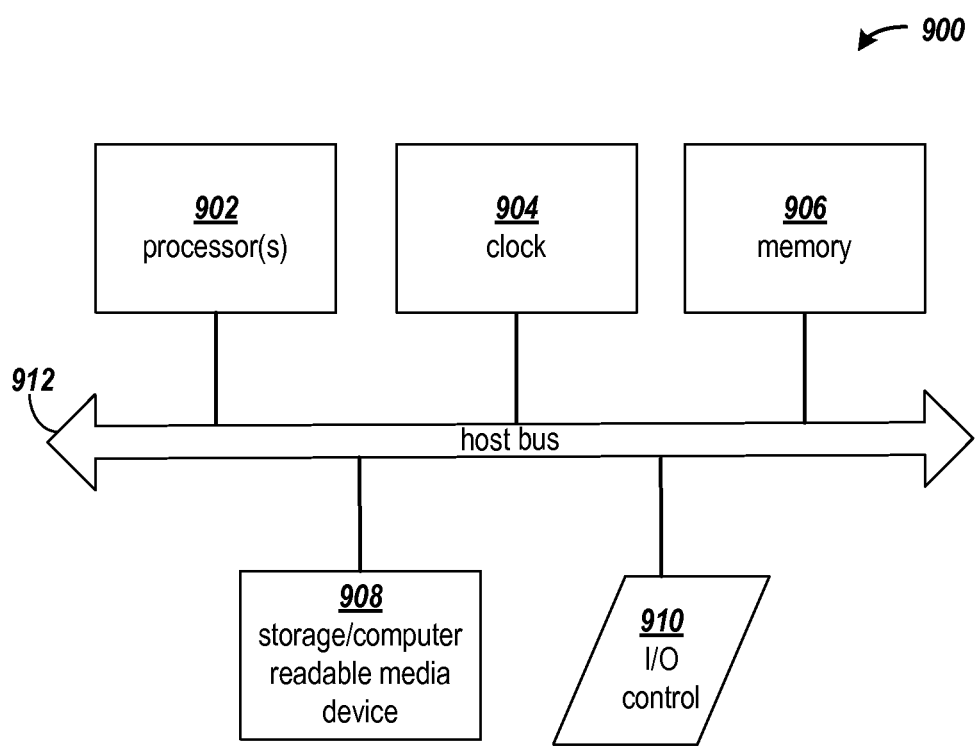
FIG. 9 shows a block diagram of an example computing arrangement that may be configured to implement the data structures and processes described herein.

FIG. 9 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 900 includes one or more processors 902, a clock signal generator 904, a memory arrangement 906, a storage arrangement 908, and an input/output control unit 910, all coupled to a host bus 912. The arrangement 900 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 902 may be one or more general purpose processors, or a combination of one or more general purpose processors and suitable co-processors, or one or more specialized processors (e.g., RISC, CISC, pipelined, etc.).

The memory arrangement 906 typically includes multiple levels of cache memory, and a main memory. The storage arrangement 908 may include local and/or remote persistent storage, such as provided by magnetic disks (not shown), flash, EPROM, or other non-volatile data storage. The storage unit may be read or read/write capable. Further, the memory arrangement 906 and storage arrangement 908 may be combined in a single arrangement.

The processor(s) 902 executes the software in storage arrangement 908 and/or memory arrangement 906, reads data from and stores data to the storage arrangement 908 and/or memory arrangement 906, and communicates with external devices through the input/output control arrangement 910. These functions are synchronized by the clock signal generator 904. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for optimizing logic associated with finite state machines. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of processing a circuit design, comprising:
on a programmed processor, performing operations including:
inputting a placed circuit design that has been placed on programmable resources of a programmable integrated circuit (IC);
wherein the programmable resources include pluralities of sequential elements, clock buffers, and programmable logic, and the plurality of clock buffers includes a plurality of different types of clock buffers;
wherein ones of the plurality of clock buffers that are assigned to the placed circuit design are used clock buffers, and ones of the plurality of clock buffers that are not assigned to the placed circuit design are unused clock buffers;
determining a critical path from a first sequential element to a second sequential element, the first and second sequential elements being ones of the plurality of sequential elements assigned to the placed circuit design;
determining a first clock buffer of the used clock buffers that provides a clock signal to the first and second sequential elements;
selecting one of the unused clock buffers of the same type as the first clock buffer and based on proximity to the first sequential element; and
modifying the placed circuit design to include the one unused clock buffer as a second clock buffer coupled to receive a clock signal in parallel with the first clock buffer and to provide the clock signal to the first sequential element;
determining after the modifying, whether or not timing of the clock signal at the first and second sequential elements satisfies a timing constraint;
selecting, in response to the timing not satisfying the timing constraint, another unused clock buffer of the unused clock buffers as a third clock buffer, the third clock buffer being of a different type from the first clock buffer; and
replacing the second clock buffer with the third clock buffer in the placed circuit design.

2. The method of claim 1, wherein:
ones of the programmable resources that are assigned to the placed circuit design are used programmable resources, and ones of the programmable resources that are not assigned to the placed circuit design are unused programmable resources; and
the operations further comprise:
determining, after the replacing, whether or not timing of the clock signal at the first and second sequential elements satisfies the timing constraint;
selecting, in response to the timing not satisfying the timing constraint, one or more of the unused programmable resources; and
modifying the placed circuit design to include the one or more unused programmable resources in a signal route that carries the clock signal from the first clock buffer to the second sequential element.

3. The method of claim 2, wherein:
the selecting the one or more of the unused programmable resources includes selecting one or more of the unused clock buffers; and
the modifying of the placed circuit design includes modifying the placed circuit design to include the one or more unused clock buffers as one or more additional clock buffers that are serially connected to receive the clock signal output from the first clock buffer and to provide the clock signal to the second sequential element.

4. The method of claim 3, the unused programmable resources further including a plurality of unused programmable routing resources, the operations further comprising:
determining, after modifying the placed circuit design to include the one or more additional clock buffers, whether or not timing of the clock signal at the first and second sequential elements satisfies the timing constraint;
selecting, in response to the timing not satisfying the timing constraint, one or more of the unused programmable routing resources; and
modifying the placed circuit design to include the one or more programmable routing resources connected to receive the clock signal output from the serially connected one or more additional clock buffers and to provide the clock signal to the second sequential element.

5. The method of claim 1, wherein:
ones of the programmable resources that are assigned to the placed circuit design are used programmable resources, and ones of the programmable resources that are not assigned to the placed circuit design are unused programmable resources; and
the operations further comprise:
selecting one or more of the unused programmable resources; and
modifying the placed circuit design to include the one or more programmable routing resources in a signal route that carries the clock signal from the first clock buffer to the second sequential element.

6. The method of claim 5, wherein:
the selecting the one or more of the unused programmable resources includes selecting one or more of the unused clock buffers; and
the modifying of the placed circuit design includes modifying the placed circuit design to include the one or more unused clock buffers as one or more additional clock buffers that are serially connected to receive the clock signal output from the first clock buffer and to provide the clock signal to the second sequential element.

7. The method of claim 6, the unused programmable resources further including a plurality of unused programmable routing resources, the operations further comprising:
selecting one or more of the unused programmable routing resources; and
modifying the placed circuit design to include the one or more programmable routing resources connected to receive the clock signal output from the serially connected one or more additional clock buffers and to provide the clock signal to the second sequential element.

8. A system, comprising:
one or more processors; and
a memory coupled to the one or more processors, wherein the memory is configured with instructions that when executed by the one or more processors cause the one or more processors to:
input a placed circuit design that has been placed on programmable resources of a programmable integrated circuit (IC);
wherein the programmable resources include pluralities of sequential elements, clock buffers, and programmable logic, and the plurality of clock buffers includes a plurality of different types of clock buffers;
wherein ones of the plurality of clock buffers that are assigned to the placed circuit design are used clock buffers, and ones of the plurality of clock buffers that are not assigned to the placed circuit design are unused clock buffers;
determine a critical path from a first sequential element to a second sequential element, the first and second sequential elements being ones of the plurality of sequential elements assigned to the placed circuit design;
determine a first clock buffer of the used clock buffers that provides a clock signal to the first and second sequential elements;
select one of the unused clock buffers of the same type as the first clock buffer and based on proximity to the first sequential element; and
modify the placed circuit design to include the one unused clock buffer as a second clock buffer coupled to receive a clock signal in parallel with the first clock buffer and to provide the clock signal to the first sequential element;
determine after the modifying, whether or not timing of the clock signal at the first and second sequential elements satisfies a timing constraint;
select, in response to the timing not satisfying the timing constraint, another unused clock buffer of the unused clock buffers as a third clock buffer, the third clock buffer being of a different type from the first clock buffer; and
replace the second clock buffer with the third clock buffer in the placed circuit design.

9. The system of claim 8, wherein:
ones of the programmable resources that are assigned to the placed circuit design are used programmable resources, and ones of the programmable resources that are not assigned to the placed circuit design are unused programmable resources; and
the memory is further configured with instructions that when executed by the one or more processors cause the one or more processors to:
select one or more of the unused programmable resources; and
modify the placed circuit design to include the one or more programmable resources in a signal route that carries the clock signal from the first clock buffer to the second sequential element.

10. The system of claim 9, wherein:
the instructions that cause the one or more processors to select the one or more of the unused programmable resources include instructions that cause the one or more processors to select one or more of the unused clock buffers; and
the instructions that cause the one or more processors to modify the placed circuit design include instructions that cause the one or more processors to modify the placed circuit design to include the one or more unused clock buffers as one or more additional clock buffers that are serially connected to receive the clock signal output from the first clock buffer and to provide the clock signal to the second sequential element.

11. The system of claim 10, wherein:
the programmable resources further include a plurality of unused programmable routing resources; and
the memory is further configured with instructions that when executed by the one or more processors cause the one or more processors to:
select one or more of the unused programmable routing resources; and
modify the placed circuit design to include the one or more programmable routing resources connected to receive the clock signal output from the serially connected one or more additional clock buffers and to provide the clock signal to the second sequential element.

* * * * *